United States Patent [19]

Imaizumi

[11] Patent Number: 5,018,608
[45] Date of Patent: May 28, 1991

[54] HYDRAULIC SHOCK ABSORBER

[75] Inventor: Tomio Imaizumi, Kanagawa, Japan

[73] Assignee: Tokico Ltd., Kawasaki, Japan

[21] Appl. No.: 524,054

[22] Filed: May 16, 1990

[30] Foreign Application Priority Data

May 19, 1989 [JP] Japan ................................. 1-126140

[51] Int. Cl.$^5$ .............................................. F16F 9/34
[52] U.S. Cl. ...................... 188/322.15; 188/282
[58] Field of Search .......... 188/281, 282, 280, 322.15, 188/322.22, 317

[56] References Cited

U.S. PATENT DOCUMENTS

| 4,203,507 | 5/1980 | Tomita et al. | |
| 4,484,669 | 11/1984 | Kato | |
| 4,615,420 | 10/1986 | Mourray | |
| 4,653,617 | 3/1987 | Casimir et al. | 188/322.15 |
| 4,923,038 | 5/1990 | Lizell | 188/280 X |
| 4,953,671 | 9/1990 | Imaizumi | 188/282 X |
| 4,964,493 | 10/1990 | Yamaura et al. | 188/322.15 |

FOREIGN PATENT DOCUMENTS

| 207409 | 1/1987 | European Pat. Off. |
| 2364833 | 7/1975 | Fed. Rep. of Germany |
| 1060824 | 4/1954 | France |
| 42-17787 | 9/1942 | Japan |
| 59-11932 | 1/1984 | Japan |
| 61-1729 | 1/1986 | Japan |
| 61-40533 | 3/1986 | Japan |
| 1004233 | 9/1965 | United Kingdom |
| 1128249 | 9/1968 | United Kingdom |
| 1476353 | 6/1977 | United Kingdom |
| 987111 | 3/1986 | United Kingdom |
| 2170572 | 8/1986 | United Kingdom |

Primary Examiner—Matthew C. Graham
Assistant Examiner—Peter M. Poon
Attorney, Agent, or Firm—Wenderoth, Lind & Ponack

[57] ABSTRACT

A hydraulic shock absorber comprising a cylinder, a partition member for partitioning the interior of the cylinder into two chambers and a damping force generating mechanism for regulating the oil flow through a communication passageway formed through the partition member and connecting the two chambers with each other. The damping force generating mechanism comprises a disk valve seated on a seat formed on the partition member and adapted to open in response to the oil pressure in the communication passageway; a damping force regulating chamber arranged on the side of the disk valve remote from the partition member; an oil passageway for connecting the damping force regulating chamber to the communication passageway; an orifice disposed in the oil passageway to restrict the area of the oil passageway for oil flow therethrough; and fulcrum member arranged in the damping force regulating chamber and in contact with the disk valve for providing a fulcrum for the disk valve to deflect. The fulcrum member is designed such that the contact position in which the fulcrum member contacts with the disk valve is shifted in the radially outward direction of the disk valve in response to increase in the pressure of oil which flows into the damping force regulating chamber through the orifice.

7 Claims, 5 Drawing Sheets

HYDRAULIC SHOCK ABSORBER

BACKGROUND OF THE INVENTION

1. Field of the Invention

The present invention relates to a hydraulic shock absorber for use in a vehicle.

2. Description of the Related Art

Japanese Patent Publication No. 42-17787, discloses a hydraulic shock absorber which is constructed with the aim of providing both operating stability and riding comfort to generate a normal damping force in response to a low frequency vibration applied to a car and a little or no damping force in response to a high frequency vibration.

As shown in FIG. 1, in such a hydraulic shock absorber, an upper pressure chamber 4 and a lower pressure chamber 5 are arranged on the upper and lower sides of a valve 3 which closes an oil passageway 2 formed in a piston 1. A chamber 6 partitioned on the upper side of the piston 1 communicates with the lower pressure chamber 5 via an oil chamber 7 whose volume varies with the internal pressure. An orifice 8 is arranged between the chamber 0 and the oil chamber 7.

According to the above construction of the hydraulic shock absorber, when frequency of a pressure change in the chamber 6 on the upper side of the piston 1 is low, a large amount of oil flows through the orifice 8 and the oil chamber 7 to the lower pressure chamber 5 to increase the oil pressure in the lower pressure chamber 5. This results in augmenting a force acting in a direction so as to close the valve 3, thereby generating a normal damping force.

On the contrary, when frequency of the pressure change in the chamber 6 is high, the orifice 8 restricts the oil flow to the oil chamber 7, thus limiting the pressure increase in the oil chamber 7. Since the pressure in the lower pressure chamber S becomes lower than that in the upper pressure chamber 4, the degree to which the valve 3 opens increases, whereby a little damping force is generated.

Such a conventional hydraulic shock absorber as described above has the following problems.

Since the hydraulic shock absorber requires a free piston 9 or a diaphragm so that the volume of the oil chamber 7 changes according to internal pressure, machining of the hydraulic shock absorber demands precise dimensional tolerances. In addition, the complicated structure causes high production costs.

Further, in order to secure the volume of the oil chamber 7, the oil chamber 7 should be arranged to extend long in the upper and lower directions (along the axial direction). This leads to a hydraulic shock absorber which is long in the total length and therefore difficult to miniaturize.

Moreover, either the extension stroke of the hydraulic shock absorber or the contraction stroke is only controlled. (The hydraulic shock absorber shown in FIG. 1 is adapted to control the extension stroke.) The identical two systems, disposed symmetrically with the upper and lower parts, would control the extension and contraction strokes. This is, however, impractical due to a hydraulic shock absorber extending lengthwise in the axial direction.

SUMMARY OF THE INVENTION

The present invention overcomes the above-described problems and its object is to provide a simpler-structured hydraulic shock absorber which permits generating damping forces of various magnitudes corresponding to the frequency of vibrations applied to the car.

A hydraulic shock absorber according to the present invention comprises a damping force generating system which regulates the oil flow developed in a communication passageway to generate a damping force, the communication passageway connecting to two chambers formed by a partition member in a cylinder, the damping force generating system comprising a disk valve which opens in response to the oil pressure in the communication passageway, the disk valve being seated on a seat formed on the partition member, a damping force regulating chamber arranged on the opposite side of the partition member with respect to the disk valve, and an oil passageway for connecting the damping force regulating chamber to the communication passageway. The damping force generating system further comprises an orifice disposed in the oil passageway to restrict the area through which the oil flows in the oil passageway and fulcrum means in contact with the disk valve for providing the fulcrum of the disk valve for deflecting, the fulcrum means being arranged in the damping force regulating chamber such that the contact position of the fulcrum means with the disk valve is altered in radially outward direction of the disk valve in response to the increase in the oil pressure in the damping force regulating chamber.

According to the above-mentioned structure, as the frequency of the pressure change in the chamber partitioned by the partition member increases, the orifice arranged in the oil passageway limits the oil pressure increase in the damping force regulating chamber. As the oil pressure in the damping force regulating chamber increases, a position at which the fulcrum means contacts the disk valve shifts in a radially outward direction. For which reason, the fulcrum of the valve for deflecting when the valve is opened shifts in correspondence to the frequency, thereby regulating the damping force.

That is, when the orifice restricts the oil pressure increase in the damping force regulating chamber (when the frequency is high), the position of the fulcrum of the valve for deflecting shifts radially inward, and when the orifice does not restrict the oil pressure increase in the damping force regulating chamber (when the frequency is low), the position of the fulcrum of the valve shifts radially outward. For these reasons, when the frequency of the vibration applied to the car is high, the hydraulic shock absorber is capable of generating a small amount of damping force, while on the contrary, when the frequency is low, it is capable of generating a large amount of damping force.

Other objects and features of the present invention will become apparent from the following detailed description of the preferred embodiments when read together with reference to the accompanying drawings.

DETAILED DESCRIPTION OF THE PREFERRED EMBODIMENTS

Figure 3:
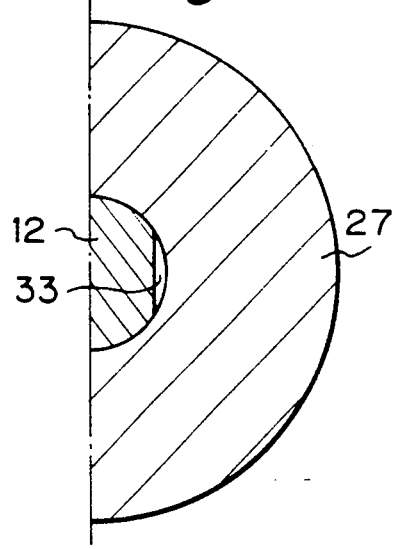
FIG. 3 is a cross-sectional view taken along line 3—3 of FIG. 2.
Figure 4:
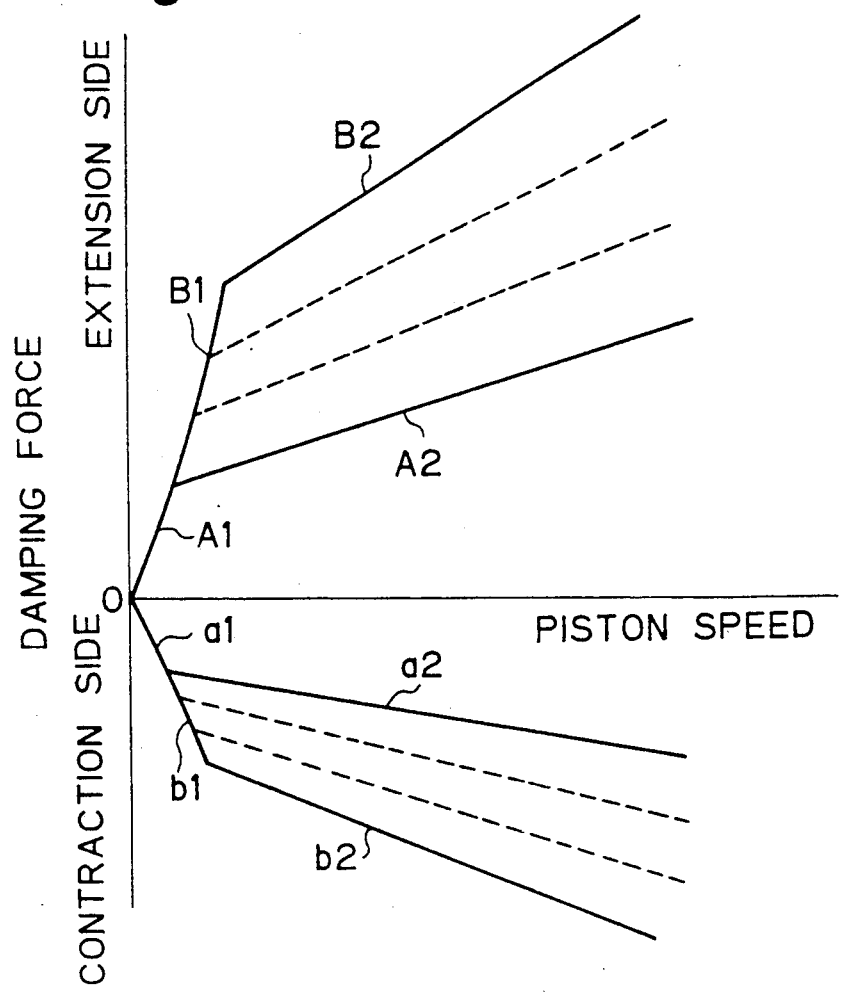
FIG. 4 is a diagram illustrating a damping force property of the hydraulic shock absorber shown in FIG. 2.

A first embodiment of the present invention will now be described with reference to FIGS. 2 to 4.

Figure 1:
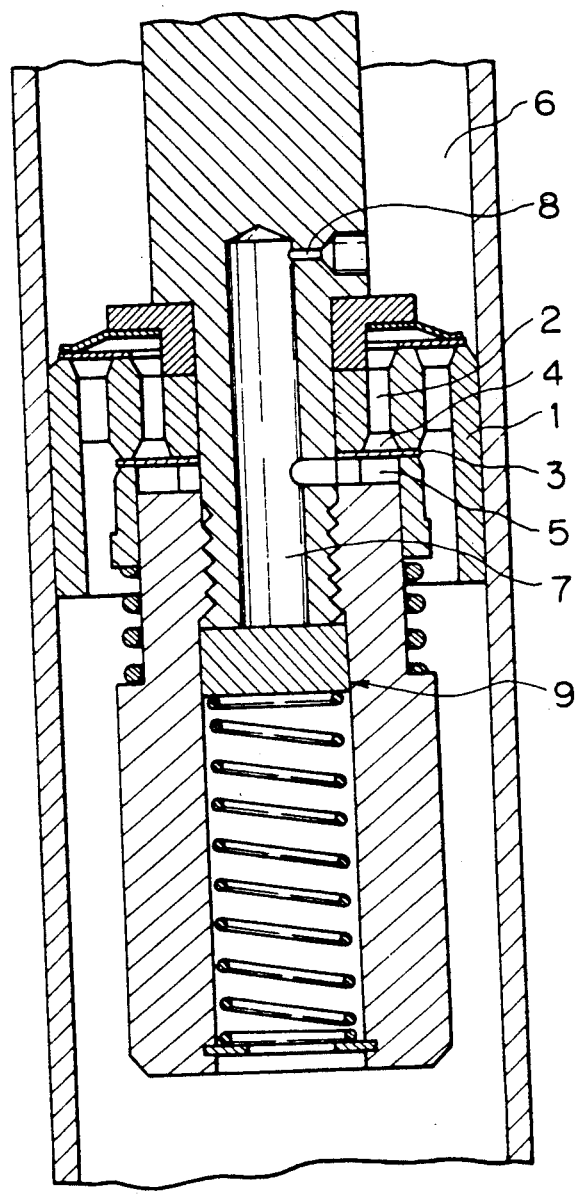
FIG. 1 is a sectional view showing the conventional hydraulic shock absorber capable of regulating damping force in accordance with frequency.
Figure 2:
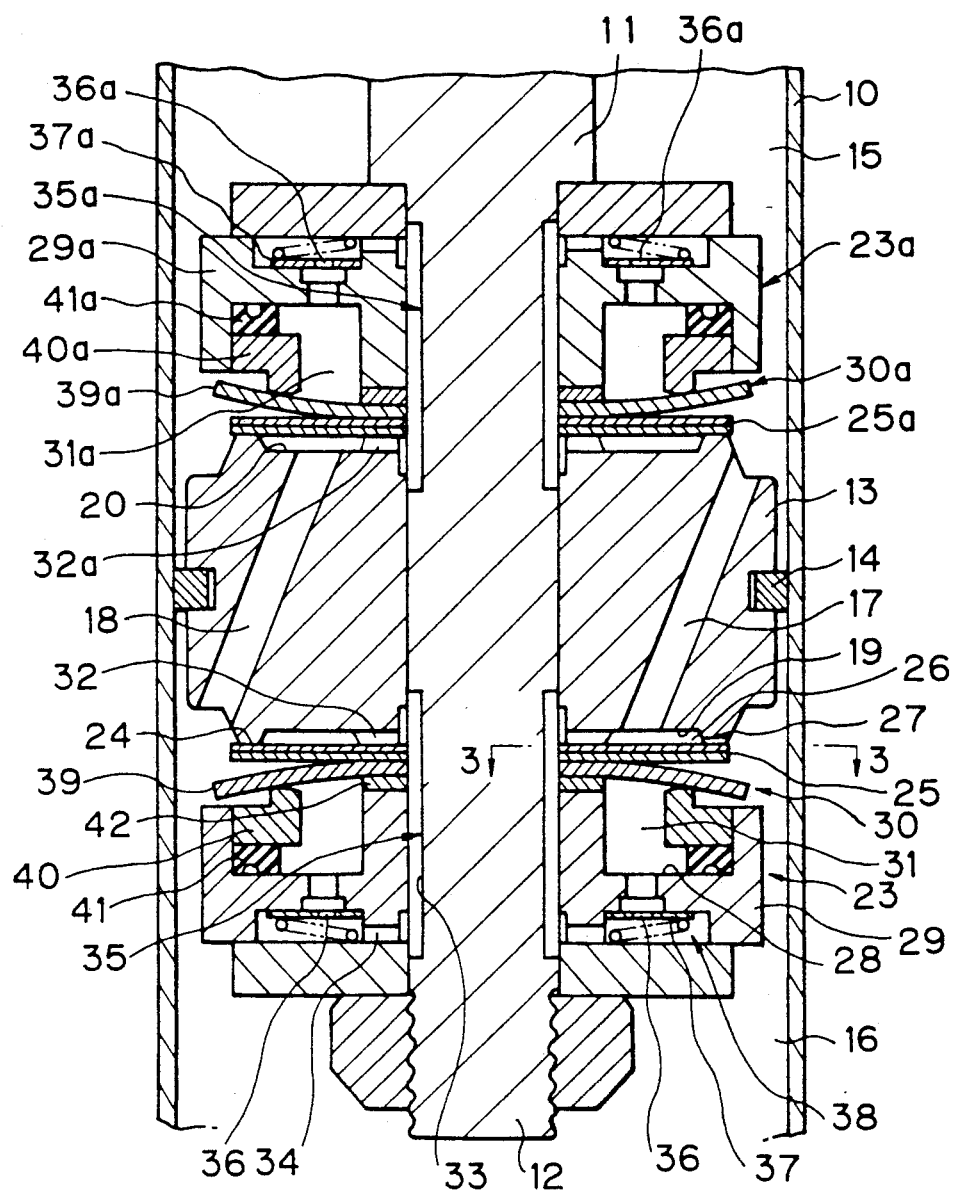
FIG. 2 is a vertical section showing the major components of a hydraulic shock absorber of an embodiment according to the present invention.

As shown in FIG. 2, a piston 13, serving as a partition member attached to a small diameter section 12 of a piston rod 11, is slidably fitted with the aid of a piston ring 14 in a cylinder 10. The piston 13 divides the inside of the cylinder 10 into an upper chamber 15 and a lower chamber 10. The piston 13 is provided with an extension side communication passageway 17 and a contraction side communication passageway 18 communicating the upper chamber 15 and the lower chamber 16 with each other. One end of the extension communication passageway 17 is open to the upper chamber 15 and the other end is open to an annular groove 10 which is formed in the end face on the lower side of the piston 13. One end of the contraction communication passageway 18 is open to the lower chamber 10 and the other end is open to an annular groove 20 which is formed in the end face on the upper side of the piston 13.

An extension side damping force generating mechanism 23, which generates damping force when the piston 13 is expanded, is arranged downstream of the extension communication passageway 17, i.e., on the lower side of the piston 13.

The construction of the extension side damping force generating mechanism 23 will now be described.

A disk valve 25 is seated on a seat 24 formed in the end face on the lower side of the piston 18. The disk valve 25 and the above-mentioned annular groove 19 constitute a pressure room 28 for receiving oil used for applying the oil pressure to the disk valve 25. Moreover, the pressure room 26 communicates with the lower chamber 19 through an orifice passageway 27 formed on the seat 24 of the piston 13.

A holder 29, having a recess 28 open to the disk valve 25, is disposed on the side of the disk valve 25 remote from the piston 13. A damping force regulating chamber 31 is defined by the recess 28 and a fulcrum means 30 which will be described later in detail. The damping force regulating chamber 31 communicates with the aforesaid pressure room 26 via an oil passageway 35. The passageway 35 comprises a cutaway passageway 32 formed in the inner wall of the annular groove 19 of the piston 13, a chamfer 33 (see FIG. 3) formed in the small diameter section 12 of the piston rod 11 and a passageway 34 formed in the holder 29. A check valve 38 comprising a disk valve 37 is arranged in the passageway 34 and an orifice 38 is formed in the disk valve 37. The check valve 38 reduces the oil flow from the pressure chamber 26 to the damping force regulating chamber 31 by means of the orifice 36 to limit the oil pressure increase in the damping force regulating chamber 31, while allowing the disk valve 37 to open wide so that the oil in the damping force regulating chamber 31 smoothly returns to the pressure chamber 26.

The fulcrum means 30 comprises a spherically-shaped backup disk 39 arranged so as to contact the disk valve 25 and a retainer 40 fitted on the internal circumference of the outer wall of the recess 28 of the above-mentioned holder 20. The fulcrum mean 30 further comprises an elastic member 41 for pressing the retainer 40 against the backup disk 39 and for sealing the gap between the damping force regulating chamber 31 and the lower chamber 16. A part of the retainer 40, the part coming into contact with the backup disk 39, is formed in the shape of a curved-surface so that the backup disk 39 can be smoothly deformed. The retainer 40 is fixed by baking to the elastic member 41. Although, in the embodiment shown in FIG. 2, a supporting member 42 is employed to support the backup disk 39, the holder 29 may alternatively directly support the backup disk 39 without the supporting member 42.

On the upper side of the piston 13 is arranged a contraction side damping force generating mechanism 23a, which controls the oil flow in the contraction communication passageway 18 to generate the damping force. Since the construction of the contraction side damping force generating mechanism 23a is the same as that of the extension side damping force generating mechanism 23, the corresponding components thereof are designated by the same numerals of the components of the extension side damping force generating mechanism 23 except that the numerals are succeeded by "a", and the explanation thereof is therefore omitted. In this embodiment, the rigidity of the disk valve 25a of the contraction side damping force generating mechanism 23a is designed to be less than the rigidity of the disk valve 25 of the extension side damping force generating mechanism 23.

The operation of the above-constructed hydraulic shock absorber will now be described.

For example, because of the increased frequency of pressure change in the upper and lower chambers 15, 16 while a car is running on a rough road, the orifices 36, 36a disposed in the oil passageways 35, 35a limit the pressure increase in the damping force regulating chambers 31, 31a. For this reason, the positions of the outer edges of the portion of the backup disks 39, 39a in contact with the disk valves 25, 25a, shift in a radially inward direction of the disk valves 25, 25a (the state shown in FIG. 2). Since these contact edges act as the fulcrums for the disk valves 25, 25a, respectively, when the valves 25, 25a are opened, a small amount of the damping force is generated as shown by lines A1-A2 and a1-a2 in FIG. 4.

Furthermore, because of the decreased frequency of pressure change in the upper and lower chambers 15, 16 while the car is running on a even road, the orifices 30, 31a do not limit the pressure increase in the damping force regulating chambers 31, 31a. For this reason, the oil pressure in the damping force regulating chambers 31, 31a increases, thereby causing the retainers 40, 40a to press the backup disks 39, 39a against the disk valves 25, 25a. The positions of the outer edges of the backup disks 39, 39a in contact with the disk valves 25, 25a, respectively, shift in a radially outward direction of the disk valves 25, 25a. Thus, the positions of the fulcrums of the disk valves 25, 25a shift outward when the valves 25, 25a are opened. For this reason, a large amount of the damping force is generated, as shown by the lines B1–B2 and b1–b2 in FIG. 4. Since the force with which the retainers 40, 40a respectively press the backup disks 39, 39a is proportional to the magnitude of the oil pressure in the damping force regulating chambers 31, 31a, respectively, the damping force is reduced proportionally and gradually in accordance with the increase in the frequency, as indicated by the broken lines in FIG. 4.

As has been described above, the damping force is regulated: it is decreased in the case of a high frequency, while on the contrary it is increased in the case of a low frequency. For this reason, the damping force is decreased while the car is running on a rough road or the like, thereby improving riding comfort. On the other hand, the damping force is increased while the car is running on a even road, thereby improving operating stability. Hence, comfort in riding and operating stability are both provided by the above combined mechanism.

Other embodiments will now be described. Only fulcrum means will be explained in detail, since the structure of the fulcrum means in the respective other embodiments is only different from that of the above-described fulcrum means and the structure of other parts is the same as that of the first embodiment. The same components as in the first embodiment are indicated by the same numerals, the explanation thereof being omitted.

Figure 5:
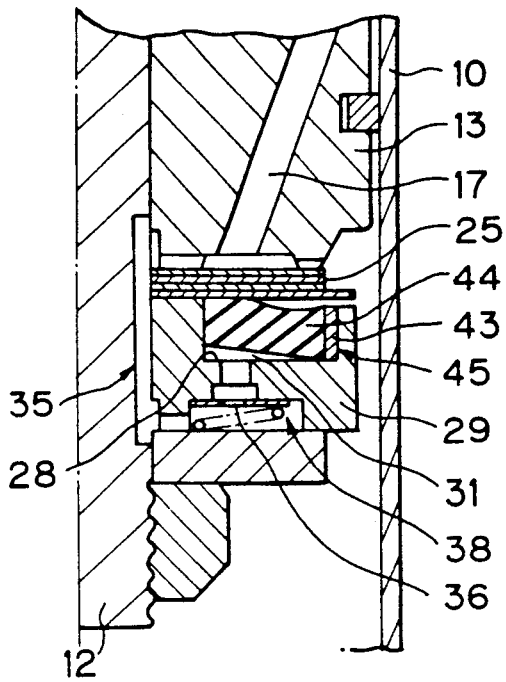
FIG. 5 is a vertical section illustrating the major components on the right side of the hydraulic shock absorber of a second embodiment according to the present invention.

The second embodiment will now be described with reference to FIG. 5. As shown in FIG. 5, a fulcrum means 45 is press-fitted inside the recess 28 of the holder 29. The fulcrum means 45 comprises an annular metal ring 43 and a rubber member 44 substantially formed in a parallelogram shape in cross section and attached, by baking, to the internal circumference of the annular metal ring 43. The internal circumference portion of the rubber member 44 contacts the disk valve 25 and the metal ring 43 on the external circumference of the rubber member 44 are fixed to the retainer 40. The rubber member 44 is forced against the disk valve 25 by the oil pressure within the damping force regulating chamber 31 formed between the recess 28 and the rubber member 44. As the oil pressure increases, the area in which the rubber member 44 is in contact with the disk valve 25 expands, thereby altering the position of the fulcrum of the disk valve 25, for deflecting, to open.

The operation of the hydraulic shock absorber according to the second embodiment is the same as that of the hydraulic shock absorber in the first embodiment.

Figure 6:
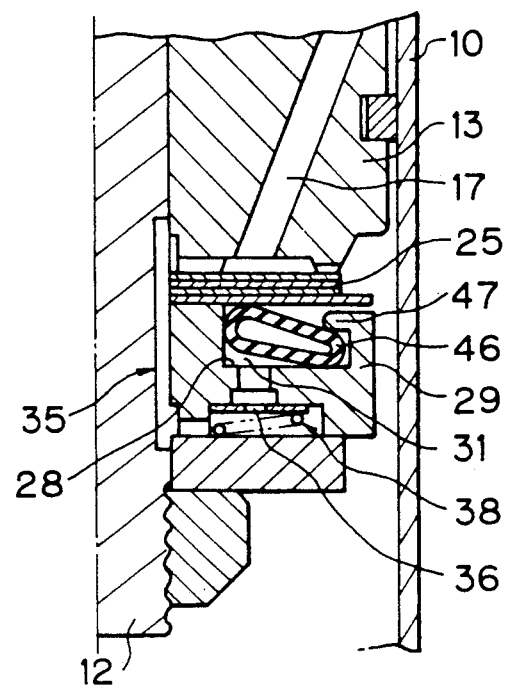
FIG. 6 is a vertical section showing the major components on the right side of the hydraulic shock absorber of a third embodiment according to the present invention.

The third embodiment will now be described with reference to FIG. 6.

An annular and flat elastic tube 46, which acts as a fulcrum means, is fitted into the recess 28 of the holder 29. The internal circumference of the tube 46 contacts the disk valve 25 and the external circumference of the tube 46 is positioned in the recess 28 by means of a projection 47 formed on the holder 29. The tube 46 is pressed against the disk valve 25 by the oil pressure in the damping force regulating chamber 31 defined by the recess 28 and the tube 46. As the oil pressure increases, the area in which tube 46 is in contact with the disk valve 25 expands outwardly, thereby shifting the position of the fulcrum for the disk valve 25 to deflect to open. The operation of the hydraulic shock absorber according to the third embodiment is the same as that of the hydraulic shock absorber in the first embodiment.

Figure 7:
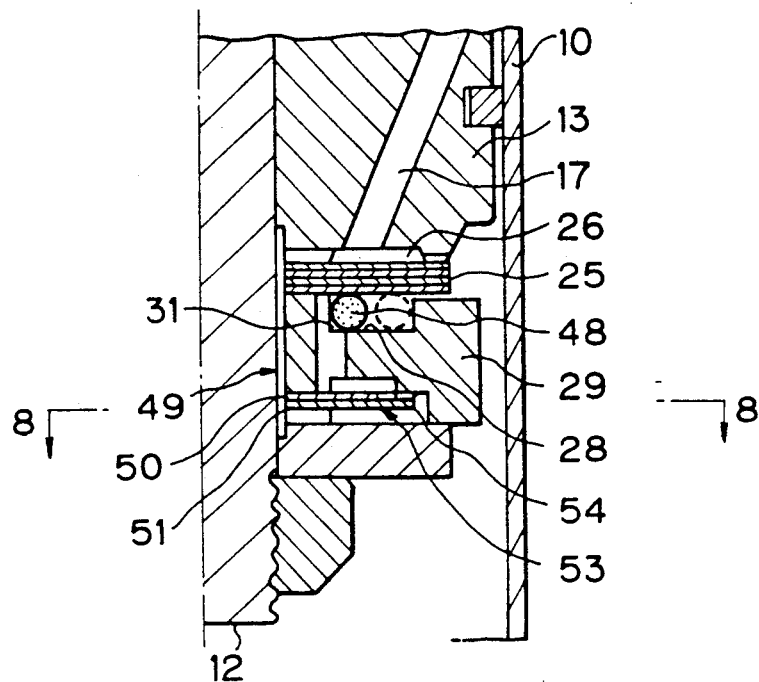
FIG. 7 is a vertical section showing the major components on the right side of the hydraulic shock absorber of a fourth embodiment according to the present invention.

The forth embodiment will now be described with reference to FIG. 7.

Figure 8:
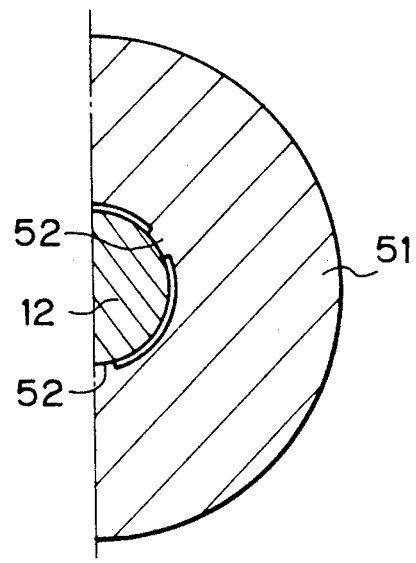
FIG. 8 is a cross-sectional view taken along line 8—8 of FIG. 7.

In this embodiment, an O ring 48 fitted into the recess 28 of the holder 29 acts as a fulcrum means. The O ring 48 is expanded in diameter in response to the oil pressure increase in the damping force regulating chamber 31. This causes the contact face of the ring 48 to shift in a radially outward direction and alter accordingly the position of the fulcrum of the disk valve 25 for deflection. In this embodiment, the structures of an oil passageway and the check valve arranged in the oil passageway are different from those in the first embodiment. The oil passageway 49 is formed by a gap between the external circumference of the small diameter section 12 of the piston rod 11 and the internal circumferences of piston 13, the disk valve 25, the holder 29 and the disk valves 50, 51. As shown in FIG. 8, projections 52 are formed in the internal circumference sides of the following members, the piston 13, the disk valve 25, the holder 29 and the disk valves 50, 51, respectively. The projections 52 are in contact with the small diameter section 12 of the piston rod 11 to determine the position of each of the members with respect to the diametrical direction. A check valve 53 comprises two disk valves 50, 51 and an orifice 54 with a cutaway formed in the disk valve 50. The orifice 54 restricts the oil flow from the pressure chamber 26 to the damping force regulating chamber 31, while the disk valves 50, 51 are opened wide so that the oil in the damping force regulating chamber 31 returns quickly to the pressure chamber 26. The operation of the hydraulic shock absorber according to the forth embodiment is the same as that of the hydraulic shock absorber in the first embodiment.

In the above-described embodiments, the damping force generating mechanism according to the present invention is arranged on the piston 13. This invention, however, is not limited to this arrangement. For example, the damping force generating mechanism may be arranged on the bottom portion of a double tube type hydraulic shock absorber. That is, the damping force generating mechanism may be arranged in such a manner that it regulates the oil flow in the communication passageway formed through a partition member, which is a partition between the interior of the inner tube and a space defined between the inner and outer tubes.

Although, in the embodiments described above, the present invention is applied to both an expansion side damping force generating mechanism and a contraction side damping force generating mechanism, the invention may be applied to either one of them only.

As has been described in detail, in the present invention, a communication passageway of a partition member communicates with a damping force regulating chamber defined on the side of a disk valve remote from the partition member through an oil passageway provided with an orifice disposed midway thereof. A fulcrum means is disposed in the damping force regulating chamber to act as a fulcrum for the disk valve to deflect to open. The fulcrum means are designed such that the position of the fulcrum shifts in response to the increase in the oil pressure in the damping force regulating chamber. The magnitude of the damping force can, therefore, be regulated in response to the frequency of a pressure change in the damping force regulating chamber.

Further, in the above-mentioned construction, the construction of the hydraulic shock absorber is simplified and the production costs thereof are reduced, since the shock absorber does not need a long oil chamber extending in the axial direction of the piston and a free piston in the oil chamber, as in the case of the conventional hydraulic shock absorber. Moreover, it is possible to miniaturize the hydraulic shock absorber in the length. As a result, the application of the present invention to both extension and contraction side damping force generating mechanisms does not lead to a lengthened shock absorber.

In addition, it is possible to provide a hydraulic shock absorber with a high degree of freedom for setting damping force characteristics, for the damping force characteristics can be changed by only modifications to the fulcrum means being made.

The invention has been described in detail with particular reference to the preferred embodiments thereof, but it will be understood that variations and modifications of the invention can be made within the spirit and scope of the invention.

What is claimed is:

1. A hydraulic shock absorber comprising a cylinder, a partition member for partitioning the interior of the cylinder into two chambers and a damping force generating mechanism for regulating the oil flow through a communication passageway formed through said partition member and connecting said two chambers with each other, said damping force generating mechanism comprising:
    a disk valve seated on a seat formed on said partition member and adapted to open in response to the oil pressure in said communication passageway:
    a damping force regulating chamber arranged on the side of said disk valve remote from said partition member:
    an oil passageway for connecting said damping force regulating chamber to said communication passageway:
    an orifice disposed in said oil passageway to restrict the area of said oil passageway for oil flow therethrough: and
    fulcrum means arranged in said damping force regulating chamber and in contact with said disk valve for providing a fulcrum for said disk valve to deflect, said fulcrum means being designed such that the contact position in which said fulcrum means contacts with said disk valve is shifted in radially outward directions of said disk valve in response to increase in the pressure of oil which flows into said damping force regulating chamber through said orifice.

2. A hydraulic shock absorber according to claim 1, wherein a check valve mechanism is arranged in said oil passageway, said check valve mechanism being constructed so as to be closed when oil flows from said communication passageway to said damping force regulating chamber only through said orifice and to open to allow substantially free flow of the oil from said damping force regulating chamber to said communication passageway.

3. A hydraulic shock absorber according to claim 2, wherein said check valve mechanism comprises a disk-like valve member, said orifice being formed in said valve member.

4. A hydraulic shock absorber according to claim 1, wherein said fulcrum means includes a spherically-shaped backup disk provided with a convex spherical outer surface adapted to contact said disk valve, said backup disk being constructed such as to be deformed to be flat in response to the increase in the pressure of oil which flows into said damping force regulating chamber through said orifice.

5. A hydraulic shock absorber according to claim 1, wherein said fulcrum means includes an annular rubber member substantially in the shape of a parallelogram in cross section, said rubber member being in contact with said disk valve at the inner circumferential portion thereof, said rubber member being designed such that the range of the portion of the rubber member in which said rubber member contacts with said disk valve is adapted to expand outwardly in response to the increase in the pressure of oil which flows into said damping force regulating chamber through said orifice.

6. A hydraulic shock absorber according to claim 1, wherein said fulcrum means includes an annular and substantially flat-shaped elastic tube, said tube being in contact with said disk valve at the inner circumferential portion thereof, said tube being designed such that the range of the portion of the tube in which said tube contacts with said disk valve is adapted to expand outwardly in response to the increase in the pressure of oil which flows into said damping force regulating chamber through said orifice.

7. A hydraulic shock absorber according in claim 1, wherein said fulcrum means includes an O ring being in contact with said disk valve, said O ring being arranged to expand in diameter in response to the increase of the pressure of oil which flows into said damping force regulating chamber through said orifice so that contact position of said O ring with said disk valve shifts in the radially outward direction of said disk valve.

* * * * *